United States Patent
Vaananen

(10) Patent No.: US 9,953,092 B2
(45) Date of Patent: Apr. 24, 2018

(54) METHOD AND MEANS FOR DATA SEARCHING AND LANGUAGE TRANSLATION

(71) Applicant: Mikko Vaananen, Helsinki (FI)

(72) Inventor: Mikko Vaananen, Helsinki (FI)

(*) Notice: Subject to any disclaimer, the term of this patent is extended or adjusted under 35 U.S.C. 154(b) by 0 days.

(21) Appl. No.: 15/008,537

(22) Filed: Jan. 28, 2016

(65) Prior Publication Data

US 2016/0154810 A1 Jun. 2, 2016

Related U.S. Application Data

(60) Division of application No. 13/390,526, filed as application No. PCT/EP2010/061611 on Aug. 10, (Continued)

(30) Foreign Application Priority Data

Aug. 21, 2009 (EP) .................................. 09168388

(51) Int. Cl.
G06F 17/30 (2006.01)
(52) U.S. Cl.
CPC ...... G06F 17/3087 (2013.01); G06F 17/3043 (2013.01); G06F 17/3053 (2013.01); G06F 17/30672 (2013.01)
(58) Field of Classification Search
None
See application file for complete search history.

(56) References Cited

U.S. PATENT DOCUMENTS 5,579,471 A 11/1996 Barber et al.
5,835,087 A 11/1998 Herz et al.
(Continued)

FOREIGN PATENT DOCUMENTS

EP 1 033 701 A2 9/2000
EP 1 037 463 A2 9/2000
(Continued)

OTHER PUBLICATIONS

Arias, M. , "Context-Based Personalization for Mobile Web Search," In Proceedings of VLDB, 2008, pp. 7.
(Continued)

*Primary Examiner* — Hung Le
(74) *Attorney, Agent, or Firm* — Young & Thompson

(57) ABSTRACT

The invention relates to data searching and translation. In particular, the invention relates to searching documents from the Internet or databases. Even further, the invention also relates to translating words in documents, WebPages, images or speech from one language to the next. A computer implemented method comprising at least one computer in accordance with the invention is characterized by the following steps: receiving a search query including at least one search term, deriving at least one synonym for at least one search term, expanding the received search query with the at least one synonym, searching at least one document using the expanded search query, retrieving the search results obtained with the expanded query, ranking the said search results based on context of occurrence of at least one search term. The best mode of the invention is considered to be an Internet search engine that delivers better search results.

7 Claims, 4 Drawing Sheets

Related U.S. Application Data 2010, which is a continuation of application No. 12/758,258, filed on Apr. 12, 2010, now abandoned.

(56) References Cited

U.S. PATENT DOCUMENTS

| | | | |
|---|---|---|---|
| 6,026,388 A | | 2/2000 | Liddy et al. |
| 6,602,300 B2 | | 8/2003 | Ushioda et al. |
| 6,748,375 B1 | | 6/2004 | Wong et al. |
| 6,778,979 B2 | | 8/2004 | Grefenstette et al. |
| 7,293,017 B2 | | 11/2007 | Hurst-Hiller et al. |
| 7,421,660 B2 | | 9/2008 | Charnock et al. |
| 7,450,734 B2 | | 11/2008 | Rodriguez et al. |
| 7,565,139 B2 | | 7/2009 | Neven et al. |
| 7,593,605 B2 | | 9/2009 | King et al. |
| 7,636,714 B1 | | 12/2009 | Lamping et al. |
| 7,707,039 B2 | | 4/2010 | King et al. |
| 7,751,805 B2 | | 7/2010 | Neven et al. |
| 7,860,706 B2 | | 12/2010 | Abir |
| 7,995,118 B2 | | 8/2011 | Rothschild |
| 8,041,730 B1 | | 10/2011 | Upstill et al. |
| 8,447,144 B2 | | 5/2013 | King et al. |
| 8,631,012 B2 | | 1/2014 | Leblang et al. |
| 2002/0007384 A1 | | 1/2002 | Ushioda et al. |
| 2002/0102974 A1 | * | 8/2002 | Raith ............... H04W 88/06 455/434 |
| 2003/0004968 A1 | | 1/2003 | Romer et al. |
| 2003/0120478 A1 | | 6/2003 | Palmquist |
| 2003/0164819 A1 | | 9/2003 | Waibel |
| 2003/0229622 A1 | | 12/2003 | Middelfart |
| 2004/0003001 A1 | | 1/2004 | Shimura |
| 2004/0199502 A1 | | 10/2004 | Wong et al. |
| 2004/0236791 A1 | | 11/2004 | Kinjo |
| 2004/0260535 A1 | | 12/2004 | Chen et al. |
| 2005/0036042 A1 | | 2/2005 | Haas et al. |
| 2005/0080613 A1 | | 4/2005 | Colledge et al. |
| 2005/0086046 A1 | | 4/2005 | Bennett |
| 2005/0108200 A1 | | 5/2005 | Meik et al. |
| 2005/0149498 A1 | | 7/2005 | Lawrence |
| 2005/0261990 A1 | * | 11/2005 | Gocht ................. G06Q 30/02 707/758 |
| 2005/0289124 A1 | | 12/2005 | Kaiser et al. |
| 2006/0004716 A1 | | 1/2006 | Hurst-Hiller et al. |
| 2006/0012677 A1 | * | 1/2006 | Neven, Sr. ........... G06K 9/6807 348/61 |
| 2006/0015337 A1 | | 1/2006 | Kurzweil et al. |
| 2006/0017752 A1 | | 1/2006 | Kurzweil et al. |
| 2006/0018506 A1 | | 1/2006 | Rodriguez et al. |
| 2006/0047635 A1 | * | 3/2006 | Kraenzel .......... G06F 17/30867 |
| 2006/0047649 A1 | | 3/2006 | Liang |
| 2006/0008547 A1 | | 4/2006 | Phillips et al. |
| 2006/0085477 A1 | | 4/2006 | Phillips et al. |
| 2006/0114516 A1 | | 6/2006 | Rothschild |
| 2006/0115108 A1 | | 6/2006 | Rodriguez et al. |
| 2006/0149558 A1 | | 7/2006 | Kahn et al. |
| 2006/0176516 A1 | | 8/2006 | Rothschild |
| 2006/0184476 A1 | | 8/2006 | Kemper et al. |
| 2006/0230022 A1 | | 10/2006 | Bailey et al. |
| 2006/0240862 A1 | | 10/2006 | Neven et al. |
| 2006/0253491 A1 | | 11/2006 | Gokturk et al. |
| 2007/0078838 A1 | * | 4/2007 | Chung .............. G06F 17/30864 |
| 2007/0133947 A1 | | 6/2007 | Armitage et al. |
| 2007/0172155 A1 | | 7/2007 | Guckenberger |
| 2007/0185865 A1 | | 8/2007 | Budzik et al. |
| 2007/0214131 A1 | | 9/2007 | Cucerzan et al. |
| 2007/0233806 A1 | * | 10/2007 | Asadi ............... G06F 17/30864 709/217 |
| 2008/0000926 A1 | | 1/2008 | Ramer et al. |
| 2008/0009268 A1 | * | 1/2008 | Ramer ............. G06F 17/30867 455/412.1 |
| 2008/0021948 A1 | | 1/2008 | Wilson et al. |
| 2008/0082497 A1 | | 4/2008 | Leblang et al. |
| 2008/0162471 A1 | | 7/2008 | Bernard |
| 2008/0240572 A1 | | 10/2008 | Hoshii |
| 2008/0267504 A1 | | 10/2008 | Schloter et al. |
| 2008/0268876 A1 | * | 10/2008 | Gelfand ............... G06Q 30/02 455/457 |
| 2008/0294628 A1 | * | 11/2008 | Shoval ............ G06F 17/30702 |
| 2008/0306924 A1 | * | 12/2008 | Paolini .............. G06F 17/30026 |
| 2008/0319962 A1 | | 12/2008 | Riezler et al. |
| 2009/0012944 A1 | | 1/2009 | Rodriguez et al. |
| 2009/0004913 A1 | | 2/2009 | Gutovski |
| 2009/0049132 A1 | * | 2/2009 | Livne Gutovski ..... G06Q 30/02 709/206 |
| 2009/0059014 A1 | | 3/2009 | Rothschild |
| 2009/0063129 A1 | | 3/2009 | Tsai et al. |
| 2009/0064043 A1 | * | 3/2009 | Chu ................. H04M 1/274558 715/816 |
| 2009/0125497 A1 | | 5/2009 | Jiang et al. |
| 2009/0132506 A1 | | 5/2009 | Houck et al. |
| 2009/0182622 A1 | | 7/2009 | Agarwal et al. |
| 2009/0193003 A1 | | 7/2009 | Heymans et al. |
| 2009/0254510 A1 | | 10/2009 | Omoigui |
| 2010/0005081 A1 | | 1/2010 | Bennett |
| 2010/0030803 A1 | * | 2/2010 | Rothenberg ........... G06Q 10/06 707/803 |
| 2010/0070488 A1 | * | 3/2010 | Sylvain ............ G06F 17/30867 707/722 |
| 2010/0082585 A1 | | 4/2010 | Barsook et al. |
| 2010/0161641 A1 | | 6/2010 | Gustafson et al. |
| 2010/0173269 A1 | | 7/2010 | Puri et al. |
| 2010/0260373 A1 | | 10/2010 | Neven et al. |
| 2011/0047149 A1 | | 2/2011 | Vaananen |
| 2011/0055203 A1 | | 3/2011 | Gutt et al. |
| 2011/0085739 A1 | | 4/2011 | Zhang et al. |
| 2011/0092251 A1 | | 4/2011 | Gopalakrishnan |
| 2011/0125735 A1 | | 5/2011 | Petrou |
| 2011/0218018 A1 | | 9/2011 | Phillips et al. |
| 2012/0143858 A1 | | 6/2012 | Vaananen |
| 2012/0219239 A1 | | 8/2012 | Rothschild |
| 2012/0267504 A1 | | 10/2012 | Atluri |
| 2012/0323967 A1 | | 12/2012 | Ju et al. |

FOREIGN PATENT DOCUMENTS

| | | |
|---|---|---|
| EP | 1170677 A2 | 1/2002 |
| JP | 2008-204416 A | 9/2008 |
| WO | 00/75807 A1 | 12/2000 |
| WO | 00/75808 A1 | 12/2000 |
| WO | 2012173902 A2 | 12/2002 |
| WO | 2006009663 A1 | 1/2006 |
| WO | 2006043057 A2 | 4/2006 |
| WO | 2007022058 A2 | 2/2007 |
| WO | 2009002864 A2 | 12/2008 |
| WO | 2011020742 A1 | 2/2011 |

OTHER PUBLICATIONS

Budzik, J. and Hammond, K J., "User Interactions with Everyday Application as Context for Just-in-time Information Access," Proceedings of the 5th international conference on Intelligent user interfaces, 2000, pp. 44-51.

Carbonell, J. et al., "Context-Based Machine Translation," Proceedings of the 7th Conference of the Association for Machine Translation in the Americas, Aug. 2006, pp. 19-28.

European Search Report dated Jul. 22, 2013 in European Counterpart Patent Application No. 12197388.7.

Extended European Search Report dated Dec. 12, 2009 in European Counterpart Application No. 09168388.8.

International Search Report dated Sep. 23, 2010 in International Patent Application No. PCT/EP2010/061611.

Leake, D.B. and Scherle, R., "Towards Context—Based Search Engine Selection," Proceedings of the 6th International conference on Intelligent user interfaces, 2001, pp. 109-112.

Ratprasartporn, N. et al., "Context-based literature digital collection search," The International Journal on Very Large Data Bases, vol. 18 Issue 1, Jan. 2009, pp. 277-301.

Rhodes, B. J., "Margin Notes: Building a Contextually Aware Associative Memory," The Proceedings of the International Conference on Intelligent User Interfaces (IUI '00), Jan. 9-12, 2000, pp. 219-224.

(56) References Cited

OTHER PUBLICATIONS

Sieg, A. et al., "Ontological User Profiles for Representing Context in Web Search," Proceedings of the 2007 IEEE/WIC/ACM International Conferences on Web Intelligence and Intelligent Agent Technology—Workshops, 2007, pp. 91-94.
Soules, C. A. N. and Ganger, G. R., "Connections: Using Context to Enhance File Search," Proceedings of the twentieth ACM symposium on Operating systems principles, 2005, pp. 119-132.
Nejdl, W. and Paiu, R., "Desktop Search—How Contextual Information Influences Search Results & Rankings," In Proceedings of the IRIX Workshop At SIGIR'05, pp. 4.
Meza B. A. et al., "Context-Aware Semantic Association Ranking," Technical Report 03-010, LSDIS Lab, Computer Science, University of Georgia, Aug. 21, 2003, pp. 18.
Chirita, Paul-A. et al., "Activity Based Metadata for Semantic Desktop Search," Proceedings of the Second European conference on the Semantic Web: research and Applications, 2005, pp. 439-454.
Canadian office action dated Oct. 3, 2013 issued in Canadian application No. 2770563, 4 pages.
European Search Report dated Dec. 4, 2009, from corresponding European application, 8 pages.
Written Opinion dated Sep. 23, 2010 for International Application No. PCT/EP2010/061611, 7 pages.
Office Action dated Jan. 16, 2014, cited in co-pending U.S. Appl. No. 12/758,258.
Office Action Final dated Apr. 9, 2012, cited in co-pending U.S. Appl. No. 12/758,258.
Office Action dated Nov. 20, 2011, cited in co-pending U.S. Appl. No. 12/758,258.
Office Action dated Dec. 4, 2012, cited in co-pending U.S. Appl. No. 13/390,526.
Office Action Final dated Jun. 4, 2013, cited in co-pending U.S. Appl. No. 13/390,526.
Office Action dated Feb. 10, 2014, cited in co-pending U.S. Appl. No. 13/390,526.
Office Action Final dated Apr. 29, 2014, cited in co-pending U.S. Appl. No. 13/390,526.
Office Action dated Aug. 7, 2014, cited in co-pending U.S. Appl. No. 13/390,526.
Office Action Final dated Nov. 13, 2014, cited in co-pending U.S. Appl. No. 13/390,526.
Office Action dated Apr. 1, 2015, cited in co-pending U.S. Appl. No. 13/390,526.
Office Action Final dated Jun. 5, 2015, in co-pending U.S. Appl. No. 13/390,526.
Office Action dated Jan. 19, 2018, cited in co-pending U.S. Appl. No. 13/390,526.
European Search Report and Office Action dated Dec. 14, 2009 in corresponding European application 09168388.8.
European Office Action dated Oct. 17, 2011 in corresponding European application 09168388.8.
European Examination Decision and Search Report dated Jan. 22, 2013 in corresponding European application 09168388.8.
European Office Action dated Aug. 2, 2013 in corresponding European application 12197388.
European Office Action dated Sep. 1, 2016 in corresponding European application 10742816.1.
European Examination Decision and Search Report dated Feb. 12, 2016 in corresponding European application 12197388.
European Office Action dated Sep. 19, 2014 in corresponding European application 12197388.
European Office Action dated Dec. 6, 2017 in corresponding European application 10742816.1.
Paul Alexandru Chirita et al. "Activity Based Metadata for Semantic Desktop Search", L3S Research Center/University of Hanover, Deutscher Pavillon, Expo Plaza 1, 30539 Hanover, Germany, ESWC 2005, LNCS 3532, pp. 439-454, Springer-Verlag Berlin Heidelberg 2005.
Thomas Funkhouser et al., "A Search Engine for 3D Models", ACM Transactions on Graphics, vol. 22, No. 1, Jan. 2003, pp. 83-105, New Jersey.
Australian Office Action, (first report) dated Jan. 25, 2013 in corresponding Australian application 2010285122.
Australian Office Action, (second report) dated Jun. 11, 2013 in corresponding Australian application 2010285122.
Chinese Office Action dated Feb. 22, 2013, in corresponding China application 201080036923.2 (English translation provided).
Chinese Office Action dated Oct. 21, 2013, in corresponding China application 201080036923.2 (English translation provided).
Japanese Office Action dated Jun. 11, 2013, in corresponding Japan application 2012-525129 (English translation provided).

\* cited by examiner

METHOD AND MEANS FOR DATA SEARCHING AND LANGUAGE TRANSLATION

CROSS REFERENCE TO RELATED APPLICATION

This application is a division of application Ser. No. 13/390,526 filed on Feb. 15, 2012, currently pending which is a National Stage Entry of PCT/EP2010/061611 filed on Aug. 10, 2010, which further claims priority from U.S. application Ser. No. 12/758,258, filed on Apr. 12, 2010, which further claims priority from European Patent Application No. 09168388.8, filed on Aug. 21, 2009. The entire content of the above-identified application is hereby incorporated by reference.

TECHNICAL FIELD OF INVENTION

The invention relates to data searching and language translation. In particular, the invention relates to searching documents from the Internet or databases. Even further, the invention also relates to translating words in documents, WebPages, images or speech from one language to the next.

BACKGROUND

Searching from the Internet which spans the globe is a common experience for most office workers of today. Quite often though the search experience is frustrating, you either cannot find the documents you were looking for, or the documents that might be relevant are in a language you cannot understand. This greatly hinders the productivity of the world economy.

Internet search engines are known in the prior art, as well as machine translation software. One document that describes the situation in the prior art is WO 2009/002864 A2, which is cited here as reference. In this prior art a search query is inputted to a computer, for example of the form "How to ship a box". In this prior art the terms in the query are synonym expanded. For example the word ship can have synonyms e.g., "boat" and "send". The expanded synonym set is limited by removing the expanded synonyms that are contextually irrelevant. That is, a synonym of a term in the search query is selected based on a context of occurrence of the term in the received search query in accordance with this prior art. For example in the prior art, search results related to fishing trawlers are probably not relevant to shipping a box and thus these search results are discarded.

SUMMARY

The invention under study is directed towards a system and a method for effectively improving computerised search queries from data and computerised language translations from one language to the next.

The prior art has serious disadvantages. The inventor now asks: What if the person in the introduction is looking to ship a box of fish? Search results related to fishing trawlers might not be so irrelevant after all.

The prior art methods for searching and translating data are deficient at least in the perspective that they can make an incorrect isolated decision in the synonym expansion that leads to wrong results in the overall search execution, as the search cannot recover to the desired search results.

A further object of the invention is to solve the above problem and produce search results and translations of improved quality.

In this application "synonym" of a word A is construed as a word B that has similar meaning with word A, but is a different word. Spelling and typing errors in a word are also regarded to change the word into a synonym in this application. I.e. "aple" could be a synonym to "apple" in accordance with the invention.

In this application "context" is construed as the overall and entire logical, physical, and/or philosophical surroundings in which the word is presented or might/should be understood.

"Synonym expansion" is construed as the expansion of the original search and/or translation query into word sets having a similar meaning. For example a query "Big Aple" could be synonym expanded to:
"Big Aple"
"large apple"
"Big Apple"
"New York City"
"NYC"

"Natural language" means a past, present or future language spoken and/or written such as French, German, Esperanto, English or Chinese.

In one aspect of the invention the search query is expanded with search term synonyms. Search results are retrieved based on the expanded query. However, valid synonyms are not excluded because they merely appear to be irrelevant. For example in the case of the query: "Flow to ship a box", a trawler, albeit a fishing ship, would not be excluded. Now this will probably lead to a larger set of search results. The search results related to fishing trawlers are now still in the synonym expanded search result set.

In the invention the synonym expanded search results are then ranked based on their contextual relevance. The contextual information that is used to perform the contextual ranking on the synonym expanded search results can be derived from various sources: global known parameters, data available from the computer of the user, recent browsing history of web pages, a statistical analysis of how users in the past have accessed sites listed in the synonym expanded search query, data open in an application on the computer of the user and any other information that characterises the context in which the query is launched. For example, if the user has a browser window open with words "Cod" and/or "Salmon", both generally known fish, the contextual relevance of the "fishing trawler" is very strong, albeit it is not the closest synonym to ship. Therefore the search results with the fishing trawlers will not only be included in the search results, but will also rank high in the final list of search results that is shown to the user.

In another use scenario of the invention, the search query "how to ship a box" comes from a computer known to reside in the Arabian Desert in, say Saudi Arabia. The same synonym expanded search result set is retrieved. Now, assume the user just visited FedEx™ website for 15 seconds. Even though the search result that deals with fishing trawlers that also deliver boxes of fish is in the retrieved results it will not rank high based on its contextual relevance. The websites of the Saudi Arabian Post Office conic up quite high based on their contextual relevance, as well as any courier service that has a branch there.

Again, ranking is changed in favour of the fishing trawler search result that deals with boxes and deliveries, if the user has a document on Sauvignon Blanc (the famous grape for white wine compatible with white fish) open on his desktop.

In the invention no search results are lost by a deficient contextual decision that performs a wrong decision on an isolated search term. This is a significant advantage of the invention.

Another embodiment of the invention deploys the same aforementioned inventive technique in translating documents from one language to the next. A word to be translated into another language is analogous to a search term in some embodiments of the invention. Let us assume the sentences to be translated into English are for example in Finnish: "Matti päätti käydä kylässä. Saavutittaan Liisa tarjosi kahvit tuvassa." Synonym expanded translations may be of the following type:

1) "Matti decided to visit. On arrival Liisa offered coffee in the living room"
2) "Matti decided to drop by. On arrival Liisa offered coffee in the house."
3) "Matti decided to visit a village. On arrival Liisa offered coffee in the living room"
4) "Matti determined to drop by in a village. On arrival Liisa treated to coffee in a house"

And so on.

Now the list of search results will be very long as different permutations and combinations of different expanded synonyms combined in a different way amount to a sizable list of search results. In accordance with the invention, a search result list with validly expanded synonyms that is broad is desirable. This quite extended list of synonym expanded search results will now be subject to context based ranking.

The context based ranking can be based on general statistical trends observed from other documents in the same language, words surrounding the text to be translated, data available from the computer of the user, recent browsing history of WebPages, and any other information. Now, if the context somehow reveals that for example the events take place in Helsinki, the translations 1-2 are ranked higher, because generally Finnish speakers would not refer to Helsinki as a village as it is the biggest city and the capital city in the country. Likewise if the context reveals that Matti is unknown to Liisa, the translation 4 would rank contextually higher because "käydä kylässä" implies a social nature to the visit, and if Matti and Liisa do not know each other, it is more contextually relevant to assume that they meet in a village and have coffee that is merely offered by Liisa (e.g. in a house that is a café) rather than on Matti's personal visit in the living room of Liisa.

Thus in addition to determining the best matching document to a search, the invention can be used to produce the best matching translation. As long as outright wrong decisions in the synonym expansion are avoided, and there is enough contextual information available the outcome will be a considerably improved translation.

Some or all of the aforementioned advantages of the invention are accrued with a browser and a search engine that translates the foreign pages using the synonym expansion-context ranking technique and displays the most relevant search results that are also retrieved with the synonym expansion-context ranking technique. The invention therefore guarantees the widest searches in scope, and the most logically relevant search results are displayed first.

A computer implemented method in accordance with the invention comprises at least one computer and is characterised by the following steps:

receiving a search query comprising at least one search term,
deriving at least one synonym for at least one search term,
expanding the received search query with the at least one synonym,
searching at least one document using the said expanded search query,
retrieving the search results obtained with the said expanded query,
ranking the said synonym expanded search results based on context of occurrence of at least one search term.

An arrangement in accordance with the invention comprises at least one computer and is characterised in that:

a search query comprising at least one search term is arranged to be received,
at least one synonym for at least one search term is arranged to be derived,
the received search query is arranged to be expanded with the at least one synonym,
at least one document is arranged to be searched using the said expanded search query,
search results obtained with the said expanded query are arranged to be retrieved,
the said synonym expanded search results are arranged to be ranked based on context of occurrence of at least one search term.

A memory unit in accordance with the invention comprises software capable of executing the computer implemented search method and/or operating the search arrangement described above.

A computer implemented method in accordance with the invention for translating text from one language to another language comprising at least one computer is characterised by the following steps:

receiving a translation query comprising at least one term to be translated,
deriving at least one synonym for at least one translation term,
expanding the received translation query with the at least one synonym,
retrieving the translation results obtained with the said expanded translation query,
ranking the said synonym expanded translation results based on context of occurrence of at least one translation term.

A computer implemented arrangement in accordance with the invention for translating text from one language to another language comprising at least one computer is characterised in that:

at least one translation query comprising at least one term to be translated is arranged to be received,
at least one synonym for at least one translation term is arranged to be derived,
the received translation query is arranged to be expanded with the at least one synonym,
the translation results obtained with the said expanded translation query are arranged to be retrieved,
the said synonym expanded translation results are arranged to be ranked based on context of occurrence of at least one translation term.

A memory unit in accordance with the invention comprises software capable of executing the computer implemented translation method and/or operating the translation arrangement described above.

A memory unit in accordance with the invention comprises software, characterised in that, the software is arranged to read data from a dedicated part of a file system to extract contextual data for search and/or translation.

A search engine software in accordance with the invention is characterised in that, the search engine is arranged to rank synonym expanded search results based on context data derived from user's Internet browser, operating system, file system, database software and/or applications.

Operating system software in accordance with the invention is characterised in that, the operating system is arranged to rank synonym expanded search results based on context data derived from user's Internet browser, operating system, file system, database software and/or applications.

A software application in accordance with the invention is characterised in that, the software application is arranged to rank synonym expanded search results based on context data derived from user's Internet browser, operating system, file system, database software and/or applications.

Database software in accordance with the invention is characterised in that, the database software is arranged to rank synonym expanded search results based on context data derived from user's Internet browser, operating system, file system, database software and/or applications.

In addition and with reference to the aforementioned advantage accruing embodiments, the best mode of the invention is considered to be an Internet search engine that delivers better search results.

BRIEF DESCRIPTION OF THE DRAWINGS

In the following the invention will be described in greater detail with reference to exemplary embodiments in accordance with the accompanying drawings, in which FIG. 1 demonstrates an embodiment of the inventive search method.

Some of the embodiments are described in the dependent claims.

DETAILED DESCRIPTION OF EMBODIMENTS

Figure 1:
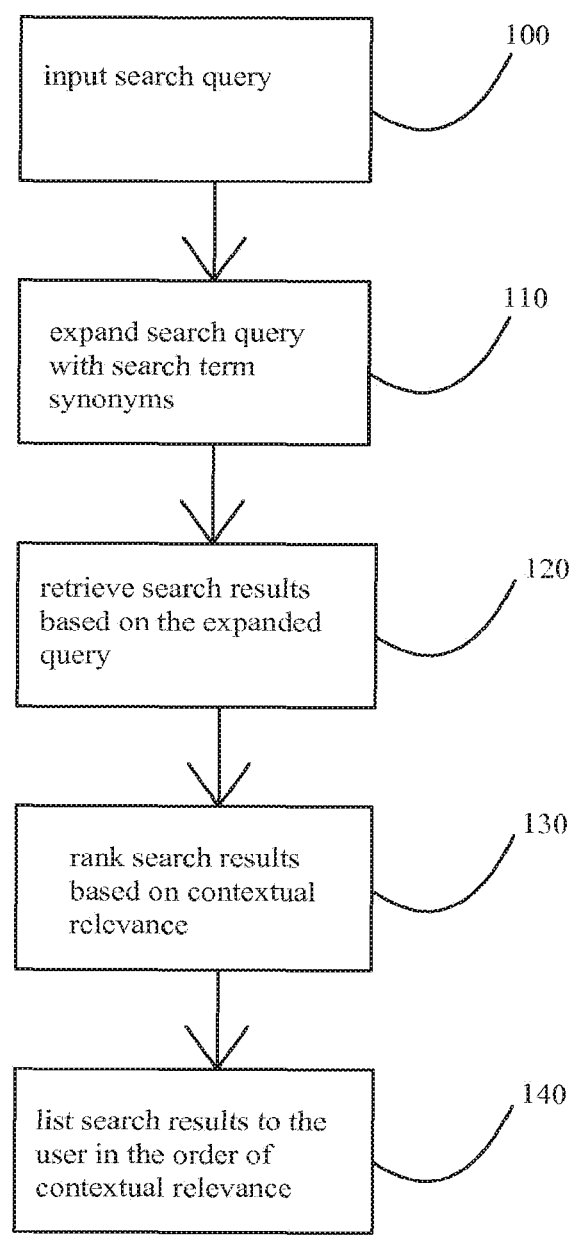

FIG. 1 shows an optimum computerised search method as a flow diagram in accordance with the invention. In phase 100 the user inputs a search query. The input can take place by typing text for example with a keyboard or other computer peripheral, by speech when preferably speech recognition is conducted by the computer to extract the query terms, and/or with an image when preferably pattern recognition is conducted by the computer to extract the query terms. For example the user can type: "how to ship a box" by a keyboard, or he can say "how to ship a box" and the speech recognition recognises the words and uses them as search terms, and/or he can take an image with a camera or a mobile phone, of a ship with a box on board and the pattern recognition software recognises the ship and the box and extracts these as search terms, and/or the user takes an image of a sign reading "how to ship a box" and the computer uses pattern and/or character recognition, such as Object Character Recognition (OCR) to identify the characters and thus the words in the sign in accordance with the invention. It is also in accordance with the invention that these input methods can be used in a mix: the user can for example write "how to" and take an image of the box on the ship and the written words "how to" and the pattern recognised words "ship" and "box" are combined to form the search query in accordance with the invention. Likewise speech and text and image and speech, or in fact all three forms of input, can be used in a mix in accordance with the invention.

The computer will arrange the terms in the order in which they arrive or are recognised, or the user can specify the order of the search terms, and/or the computer can suggest entire search queries to the user based on the recognised search terms in accordance with the invention.

In phase 110 the search query is expanded with search term synonyms. "how to" could be recognised as a phrase and expanded with a synonym "in what way", the "ship" could be expanded with synonyms such as "boat" and "send", the "box" could be expanded with a synonym "square" and "parcel". In addition to words that have a synonymous meaning, the synonym expansion will expand obvious writing versions of different words: for example "centre" (UK English) would be expanded to "center" (US English) in accordance with the invention. The inventive computing system can correct spelling errors such as "boks", "sip", "hou" that might have been caused by phonetic miss-spellings in the synonym expansion, or separately before the synonym expansion. In addition the inventive computing system can correct spelling errors based on typographical errors, for example in a QWERTY keyboard potential errors could be "boz", "shio", "hoq" in accordance with the invention. Likewise the computer system can expand different states of a noun, and/or correct words from different writing forms to standard forms. For example the Finnish language is notorious for having many states for a noun. A bay=lahti will be written landella="on the bay" or "landessa=in the bay". In some embodiments of the invention the synonym expansion will also expand the search terms to different linguistic states. In the example above a search term "landella" would be expanded to also include "landessa", "lahti" and possibly other states of the noun in accordance with the invention.

In some embodiments of the invention some terms from the search query can be omitted based on context of occurrence of a search term in order to limit the search terms in accordance with practical limitations, such as available computing power.

In phase 120 the search results are retrieved based on the expanded query. The more expanded the query, the greater the number of search results. In some embodiments of the invention the expanded search query is divided into several different search queries that are executed by the same or different computers in parallel or in series, and the search results of each separate query are combined to form the overall search results for the expanded search query. In some embodiments of the invention it is especially preferable that redundancies are eliminated from the combined list of search results.

In phase 130 the search results are ranked contextually. It is important in the invention that the ranking is based on the synonym expanded results set. The synonym expansion increases the reach of the search and delivers more search results, some of which may be or are probably even undesirable to the user. The combined synergistic effect of the contextual ranking imposed on the synonym expanded search result set is important in accordance with the invention. A search result that would have been omitted by contextual rules used in the synonym expansion will still be in the search result set in accordance with the invention, all though it is likely to be proverbially buried underneath hundreds if not millions of search results (depending on how expansive the synonym expansion is) that also match the expanded search query. Now, when all these results are ranked contextually, a search result that might have been on the millionth seed number in the synonym expanded search result will pop up to the first place, provided it has the best contextual match.

Contextual data, i.e. data for defining the context in which the synonym expanded search results are ranked may be deduced from previous browsing behaviour of the user, location of the user, time, date, nationality of the user, data on the computer of the user, general population browsing behaviour, general statistics and frequency analysis of words, and data that is open in an application on the computer of the user.

Using previous web pages of the user to define the context is preferable if the user has a consistent browsing behaviour, but many people don't. In the case of a person that checks the company intranet, and then reads a newspaper online, looks up an auction site or classifieds it might take a long browsing history to determine meaningful context data. One preferable embodiment of the invention is the use of an open application on the computer to define the context data used in ranking. For example if the user has a word processor open with a special term, say "NGC 2547", it will immediately suggest that a search term "star" actually means a stellar object in space rather than people in Hollywood or Bollywood. In this particular search the documents associated with celebrities will be ranked to the last places in the context ranked synonym expanded search result list. Documents dealing with stars in space will rank higher, documents dealing with stars that have a New General Catalogue (NGC) number will rank higher still, whereas articles on stars in cluster NGC 2547 will rank higher still. An article on a Hollywood actress claimed as arising star, hut with an explicit interest in New General Catalogue numbers would of course be dragged higher on the list than other celebrity articles, because that article would also have contextual merit from the point of view of the search.

In more detail, the context based ranking can be performed by several different methods and means in accordance with the invention. By context of occurrence we mean the context in which at least one search term occurs, i.e. the context of occurrence of at least one search term. For example when a user types a search query: "flights to London" in a search engine or program, the context of occurrence of these search terms comprise data in other applications on the computer of the user when he made the search query, and any data that is associated to the context in which the search terms now occur. If the user has an email message open with "visit to London 1-3$^{rd}$ March", the "flights to London" search terms occur in a context of the peon going to London between 1-3$^{rd}$ March, and therefore any last minute 3-day 2-night packages for 1-3$^{rd}$ of March will be ranked contextually higher. The context of occurrence thus means the context data on the user's computer, and/or to which the user's computer has access to as the search terms occur, i.e. are provided to a search engine and/or program.

In one embodiment of the invention, the system picks words or numbers from the context, such as open applications, mails, messages, temporary folder, Desktop, calendar, clock, GPS chip, operating system, previously browsed WebPages and/or the like. The picking of the words, numbers or other limiting factors to define the context can be done randomly, or by some algorithm, or even by the user in some embodiments, in accordance with the invention. The system now has the search terms that were synonym expanded, typically a huge number of search results, and terms that define the context.

Now the search results can be rearranged into an order where the document that is closest in similarity to the selected context terms is placed first.

In one simple embodiment of the invention the received search results are simply ranked in the order of common hits with the context terms. Suppose that in our earlier example with the search query "How to ship a box" the user has a webpage open that is titled "Shipping fish fast to sushi restaurants", and suppose for example that the system knows we are in Vigo, Spain, probably the largest fishing port in the world. The context terms "fish", "fast", "sushi" and "restaurant" are selected in accordance with the invention. Now the document that tells about a fishing trawler that sends sushi filets by direct delivery in boxes of ice after it docks in Vigo is probably proverbially buried on the millionth seed or similar in the search results. However, this document will now feature the highest frequency of the contextual terms, and will be rearranged to first place in contextual ranking. In its simplest embodiment context based ranking of the invention is running a new search on the original search results based only on acquired context words.

It should be understood that different search terms and/or context terms may have different weights, that may be assigned by the user, by the system, be updated from the network, or be pre-programmed into the computer in accordance with the invention.

It should also be understood that the context terms may be functional, rather than only plain words or numbers, for example context terms can be acquired in functional form such as the date, time, location, and i.e. context terms can be functional or conditional beyond their plain meaning.

In one embodiment contextual ranking is performed based on context ontologies. By ontology we mean: ontology ((computer science) a rigorous and exhaustive organization of some knowledge domain that is usually hierarchical and contains all the relevant entities and their relations source: Wordnet).

A word may have an ontology in accordance with the invention, for example the word "apple" will have an ontology of it being an example of a fruit in general as well as being the genus to species varieties like "Calville Blanc"=the French culinary apple, or "Granny Smith (=the Australian green apple with a strong taste) or Red Delicious (=the bright red apple that has a broad consumer appeal especially in the US), and the popular personal computer from California, in addition to the above the word apple might have a conditional ontology, e.g. meaning New York City when having the prefix "Big" and being in capital letters "Big Apple".

Ontology of a word can be typically stored in a file that is read by at least one search engine program. A search engine or the like can have data Files for all words in all common languages that define ontologies of those words on one computer or distributed over a network of computers. Alternatively, those files or a part of those files could be stored in the subscriber terminal, like the terminal computer the user is using, such as a PC or Apple Mac computer.

It should be noted that in accordance with the invention variable weights for different parts may exist within a word ontology. With reflection to earlier example, "Granny Smith" could have a higher relative weight in the "apple" ontology than "Calville Blanc" in some embodiments of the invention, because a priori one could assume more users searching for apples will be searching for Granny Smiths, because it is better known. The Choice can of course be made the other way around providing a higher relative weight for "Calville Blanc" in some embodiments of the invention. As a general rule, the further the connection is from the actual word itself, the lower the relative weight. For the word "apple" the relative weight in the ontology for the "apple" itself will be 100% in some embodiments, whereas for "Calville Blanc" and "Granny Smith" it could be 1% and 2% respectively or vice versa in accordance with the invention.

As said the words that were chosen to define the context may have ontologies, and in fact in some embodiments those words with well defined ontologies are typically chosen as context words over words that do not have an ontology, or have an ontology that is poorly defined or less used or the like.

In some embodiments the search results are searched with the ontologies of the context terms and those search result documents that are most similar to the ontologies of the context terms are prioritized in the ranking, i.e. ranked before less relevant search result documents.

In some embodiments of the invention some or all selected context terms may be synonym expanded too. The retrieved search results are then searched again with the synonym expanded context terms, and the search results that are most similar or have the largest number of hits of synonym expanded context terms are ranked first in the contextual ranking in some embodiments.

It should be understood that different search terms, context terms and/or ontologies may have different weights, which may be assigned by the user, by the system, be updated from the network, or be pre-programmed into the computer in accordance with the invention.

It should also be understood that the context terms and/or ontologies may be functional, rather than only plain words or numbers, for example context terms can be acquired in functional form such as the date, dune, location, i.e. context terms can be functional beyond their plain meaning. For example consider the context term "time: 12:00". If the time is +/−15 min from 12:00 in human terms time: 12:00 will very strongly equate with "Now". Quite clearly in this situation "now" would be in the ontology of the context term time: 12:00, but only functionally and/or conditionally so, if it were 8.00 pm, "now" might not be in the ontology of the context term.

In more elaborate embodiments, a user or the user terminal may have several contexts that have different ontologies such as for example Email context, Browsing context, and/or Publication context.

For example an email context will contain other information besides content, such as the time, sender and/or receiver, their identity. Many times the actual content in the email is not remembered by people who were corresponding; it is rather the sender and the time when it was sent and/or received, its importance classification or other parameters that define the context ontology of the email context.

Browsing context can be read from the browser cache in some embodiments of the invention. For example a webpage that was accessed at a certain time should be interpreted in the context of other WebPages that were accessed at the same time, or with the same or similar query string. The browser cache when read in this way can be used to determine the browsing context ontology in accordance with the invention.

Publication context on the other hand relates to what the user or user terminal decides to publish. Many users receive a lot of crap that is uninteresting to them, but people rarely post a webpage or send electronic mail or FTP files about issues that are completely uninteresting to themselves, those issues may of course be uninteresting to others. The data that the user or the user terminal publishes on the Internet or to a select group in the form of messaging can be used to define the ontology of the publication context.

When the context ontology is specified a user can assign a weight to particular regions of the ontology, or to entire ontologies. For example in the email context ontology all sent emails or terms or data that appear in sent emails could be given a user assigned relative weight of 100, when terms and/or data in received emails could be given a weight of 1. The user could set the aforementioned relative weights himself or they could be pre-programmed or set from an Internet and/or network server by a third party. Quite clearly in the publication context the weights of some elements in the ontology could be a function of publication frequency for example. A webpage that the user is updating all the time is likely to have a weight of 87 if it was updated 87 times in comparison to a webpage that was only updated once (=relative weight 1) for example, in some embodiments of the invention.

The different context and context ontologies may also have different weights, which can be user assigned, assigned from a network server and/or pre-programmed. An attorney that mainly uses email for his self expression will have an email context ontology that will have a higher relevant weight to browsing or publication ontology. A media marketing person will by contrast have a publication context ontology outweighing email context ontology for example, as the most important things on her mind are the things she publishes by way of WebPages or press releases for example.

In its simplest embodiment, a certain context, take email context for example, could have one or a collection of context terms that would be the same all the time. If the user is a travel agent selling British Airways flights "British Airways" and "Eurotraveller" are pretty constant context terms, because nearly all business is associated with booking Eurotraveller economy seats to customers. If the ontology of these constant context terms would be constant all the time, this would in effect mean that the ontology of the context, i.e. email context in this case would also be constant.

Of course having the same context terms or context ontology is not desirable for versatile users, which account for the majority of all users. In order to adapt to the changing wishes of users, the different contexts need to change too, and choose those context terms that appear to reflect the current user activity and intentions the best. If the user for example has an email program open where he is writing an email to be sent, it is a good bet for the system to acquire at least some context terms from the email the user is currently writing.

The aforementioned of course leads to the embodiment of dynamical ontology derivation for a context, when a context has different context terms at different times or different situations, which is in accordance with the invention. In some embodiments of the invention a number of contexts are being up to date as the user uses the computer system, and the context with the best fit to user activity is preferably chosen all the time, the context terms that best reflect user activity are preferably chosen all the time, and the ontology of at least one context term and/or context is preferably up to date to reflect the user activity.

It should be noted that different contexts may be combined in some embodiments to yield the context definition with different relative weights. For example a user having an email message open and browsing the Internet could be in a 70% email context 30% browsing context in accordance with the invention. In this way different contexts may be used in combination in accordance with the invention.

It should be noted that different context terms within a context ontology may have different relative weights in accordance with the invention. For example frequency of a term could add weight to a context term. If the user has an email message open that recites "flight" 5 times, the context term "flight" should have a higher relative weight than some less recited context term, on its own as an independent context term without a ontology, or in a context term ontology.

In summary different relative weights can be applied to search terms, context terms, contexts, search term ontologies, context term ontologies, context ontologies and/or individual elements within any ontology and in this way any criteria for contextual ranking can be formed in accordance with the invention in any embodiments of the invention.

Context based ranking based on context ontologies can be visualised with the assistance of RDF (Resource Description Framework)—metadata graphs. One example of this is in FIG. 1 of "Desktop Search—How Contextual Information Influences Search Results and Rankings" by Paiu and Nejdl which is cited here and incorporated as reference to this application. This RDF-metadata graph shows a context ontology which specifies context metadata from emails, files, web pages and publications with relations among them. The relations are described in "Activity Base Metadata for Semantic Desktop Search"—Proceedings of the $2^{nd}$ European Semantic Web Conference, Heraklion, Greece, May 2005 which is also cited here as reference and incorporated into this application. The context ontology elements and the relations between them can be used to search the synonym expanded search results, and prioritise these search results by means of contextual ranking. The relations and metadata within the ontology are typically derived from user activity in some embodiments, for example from when, to whom, and about what subject the user is emailing messages and with what attachment files. Typically those synonym expanded search results that rate highest in similarity to the context ontology that contains the metadata and/or relations are placed with the best rank in the contextual ranking in accordance with the invention.

Figure 2:
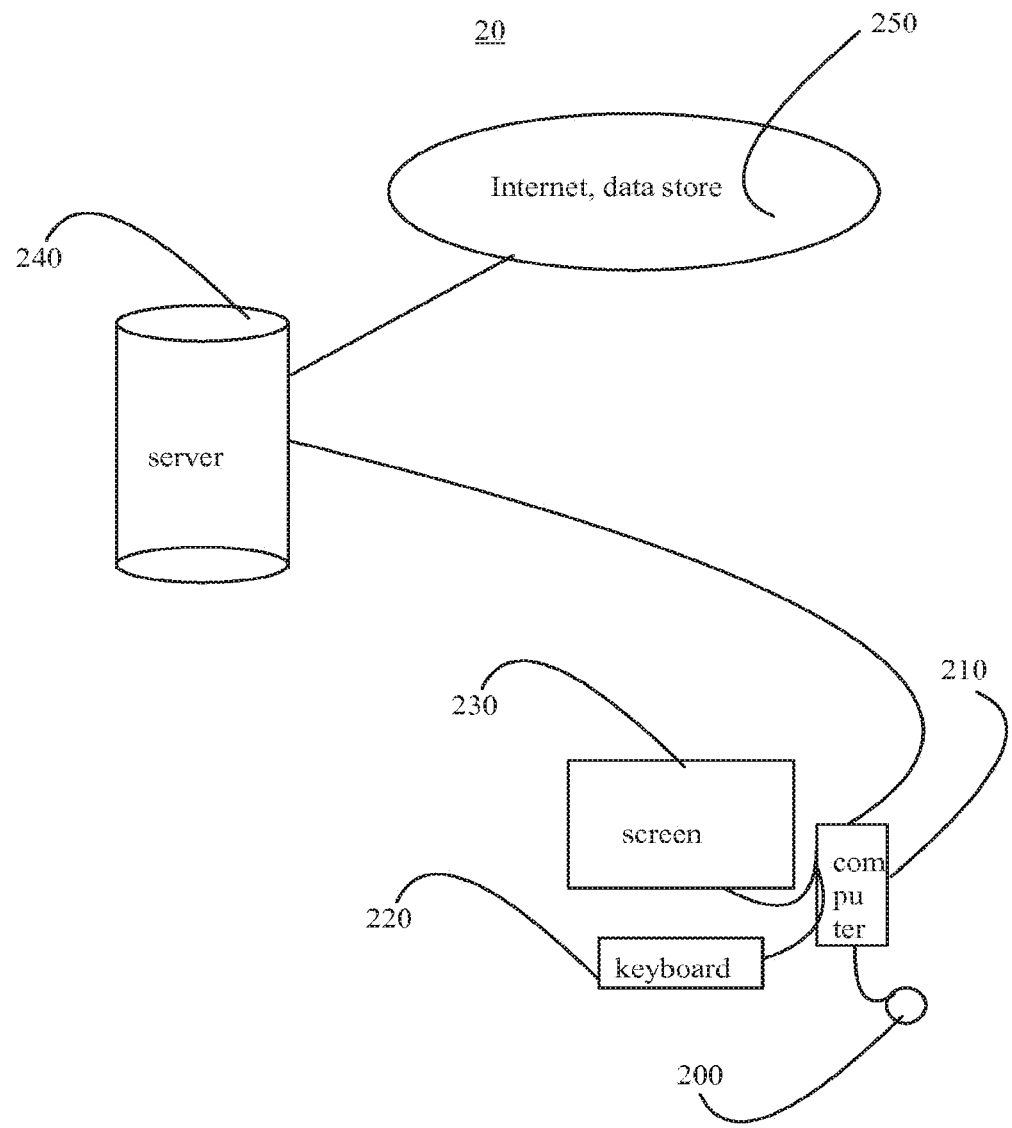
FIG. 2 demonstrates an embodiment 20 of the arrangement used to perform the searches and/or translations in accordance with the invention.

Another embodiment with which to visualise context based ranking is with authority transfer annotations using schema graphs which is also explained in "Desktop Search How Contextual Information influences Search Results and Rankings" by Paiu and Nejdl. Some metadata is more important than other metadata, for example if the sender field contains the boss of the employee, this would be more authoritative metadata than the sender fields of the endless spam-emails most of us receive. In FIG. 2 of the aforementioned document it is shown how authority is transferred within the context ontology, for example the attachment that was attached to an email that the boss sent is more authoritative than if the file would have arrived by spam email. The more authoritative an element in the context ontology is, the higher relative weight it will have in some embodiments of the invention. When the synonym expanded search results are ranked contextually by ranking them against the context ontology, those synonym expanded search results that have similarities to more important and/or authoritative parts of the context ontology will be ranked first in accordance with the invention.

Furthermore, the document "Context-Aware Semantic Association Ranking by Aleman-Meza, Halaschek, Arpinar and Sheth describes techniques for context based ranking in detail, and is included here as reference to this application. It is in accordance with the invention that the contextual ranking is based on semantic association ranking. In this embodiment context ontology is defined as explained earlier. Now, the synonym expanded search results are compared against the context ontology by seeing which search results are most closely semantically associated with the context and/or context ontology. Semantic association between a context and a synonym expanded search result is measured by overall path weight. The overall path weigh $W_p$=+User defined weight+Context weight+Subsumption weight (class specialization in a path)+Trust weight (of the path between context & search result), as explained in Context-Aware Semantic Association Ranking by Aleman-Meza, Halaschek, Arpinar and Sheth. It is in accordance with the invention that the synonym expanded search results are contextually ranked so, that those synonym expanded search results that are most closely semantically associated (and/or have the highest overall path weight) with the specified context and/or context ontology are ranked first. Quite clearly it is in accordance with the invention that the semantic association and/or the overall path length can be composed from any permutation and/or combination of the aforementioned components. For example user defined weights could be left out in some embodiments of the invention.

As explained before contextual ranking of phase 130 may be performed with different techniques. It is in accordance with the invention that these techniques can be combined and/or permuted in accordance with the invention.

In phase 140 the contextually ranked synonym expanded search results are displayed to the user in the order of contextual relevance. Typically the said list is displayed in the monitor and the user can move to different positions in the list and select any search result for more detailed viewing. In some embodiments some portion of the final search results might be discarded, for example the contextually least relevant search results. Discarding search results now is not as dangerous as based on a contextual analysis of a search term earlier. The search result to be discarded has been considered vis-a-vis its objective content of the substantive meaning of the search terms as well as its context in comparison to the context of the query as a whole or in part in some embodiments.

In fact it could be stated that as long as the synonym expansion is expansive enough and the user provides enough information to define the context the invention will find the best match to the query of the user in the searched documents. It is another matter of course, if the desired document is available, but by connecting the invention to the Internet users will find their desired information better than ever before.

It should be noted that any features, phases or parts of the method 10 can be freely permuted and combined with embodiments 20, 30, 40 in accordance with the invention.

FIG. 2 shows an exemplary arrangement for conducting inventive searches. The embodiment 20 refers more particularly to Internet searches, but the invention can of course be used with any data searches from any number of documents or databases. The user will use the computer 210 with the keyboard 220 and/or a peripheral like a mouse 200 and read and look at results from the screen 230. If the search query is directed to at least one database or document on the computer 210 the inventive search method can be operated "off-line" i.e. internally in the computer and the search results are shown on the screen 230. In some embodiments the search software needed to carry out the searches with the inventive method resides on the server 240 only and the documents on computer 210 need to be searched with the inventive search method. In this embodiment the server 240 searches the hard drives, memory, files or databases on computer 210.

In many embodiments part of the inventive system can be distributed to several servers, several client computers, and/or so that some parts of the system are distributed to at least one client computer, and some parts that are different or the same are distributed to a server computer.

The most typical use embodiment of the invention is normal Internet search. A search query is forwarded from the computer of the user to a server of an Internet Search Engine. Exemplary prior art search engines are currently known to operate by various names such as Google™, Bing™, Yahoo™, Lycos™ and the like. The server 240 receives the search query and conducts the inventive Internet search. In some embodiments, especially those where the synonym expansion leads to a very large number of synonym expanded search queries, it is preferable for the server to execute the search queries in parallel or in series as separate search queries and collect the total list of the search results from the searches with the synonym expanded search queries. In this embodiment it is preferable to eliminate redundancies from the total list, (i.e. the sum list of synonym expanded search results) prior to the contextual ranking, as the redundancy elimination leaves less search results to be ranked and saves processing resources.

The server 240 is typically arranged to search the Internet or databases but it may also search any files, documents, and/or data that it has access to in accordance with the invention. It is in accordance with the invention that there are more than one server 240 that share the processing of the search query, or the server 240 may relay the search query to another server in accordance with the invention.

It is in accordance with the invention that the computer 210, screen 230, keyboard 220 and/or mouse 200 can be replaced by a mobile phone, laptop or any portable computing device, or in fact any device that can receive a search query, irrespective of whether the computational resources reside on that device and/or the server 240. It is in accordance with the invention that the search queries can be inputted by speech or images, in which case the computer could be replaced merely by a microphone, or a normal telephone wireless or wire line to receive the search query. In the case of image input the computer features, or is replaced by a camera used to take the images. In some embodiments it would be preferable to receive digital images as input for the inventive search, but naturally film images can be digitised and used by the inventive computerised search in accordance with the invention.

All communications connections between any computers or devices whether client computers, dumb terminals or server devices can be arranged as wireless connections, such as radio/microwave/optical, for example GSM, CDMA, WIFI, free space optics (FSO), and/or fixed communications connections such as data cable, POTS, and/or optical network e.g. SONET/SDH/Ethernet. Quite clearly the inventive method can be executed in an arrangement that comprises only one computer, several computers or a computer network.

The contextual data needed to perform the contextual ranking of the synonym expanded search results can be obtained in a variety of ways: the server 240 may observe the previous searches made by the user, the Internet and/or database and/or document browsing behaviour of the user and deduce the context based on the occurrence of words in that document in some embodiments.

The user may specify a context by text entry or multiple choice to the computer in some embodiments. There may be data on the computer 210 of the user that is used to define the context data in some embodiments. The data on the user's computer can be used to define context data in a multitude of ways. It is possible to use all data on the computer 210 to define the context but this requires a great deal of data processing. In some embodiments of the invention the user has a dedicated folder that contains documents that relate to the area of interest to the user. The documents only in this folder are read to define the context data in some embodiments. For example, the user could have a scanned fishing permit in his context folder on the computer. Whilst he would input "how to ship a box" the context would be "fishing" and the documents related to fishing trawlers shipping boxes of fish would rank high in the final search results.

Indeed in some embodiments the contextual ranking based on a dedicated context folder on the computer of the user can be used without synonym expansion in accordance with the invention.

It should be noted that the inventive search method can be used also to search data stored in an application, for example an email application in some embodiments of the invention. The contextual ranking based on a dedicated context folder on the computer of the user can be used without synonym expansion to search for data in applications in accordance with the invention in some embodiments. The contextual ranking based on a dedicated context folder on the computer of the user or in the network is inventive on its own right and may be used to rank search results, but also synonyms in accordance with the invention. For example the synonyms of the synonym expansion could be ranked by the contextual ranking based on contents in a dedicated context folder, with only the highest ranking synonyms being accepted to at least one search query in accordance with the invention.

Quite clearly any contextual ranking methods explained in association with phase 130 may be used in or by the arrangement 20.

It should be noted that any features, phases or parts of the arrangement 20 can be freely permuted and combined with embodiments 10, 30, 40 in accordance with the invention.

Figure 3:
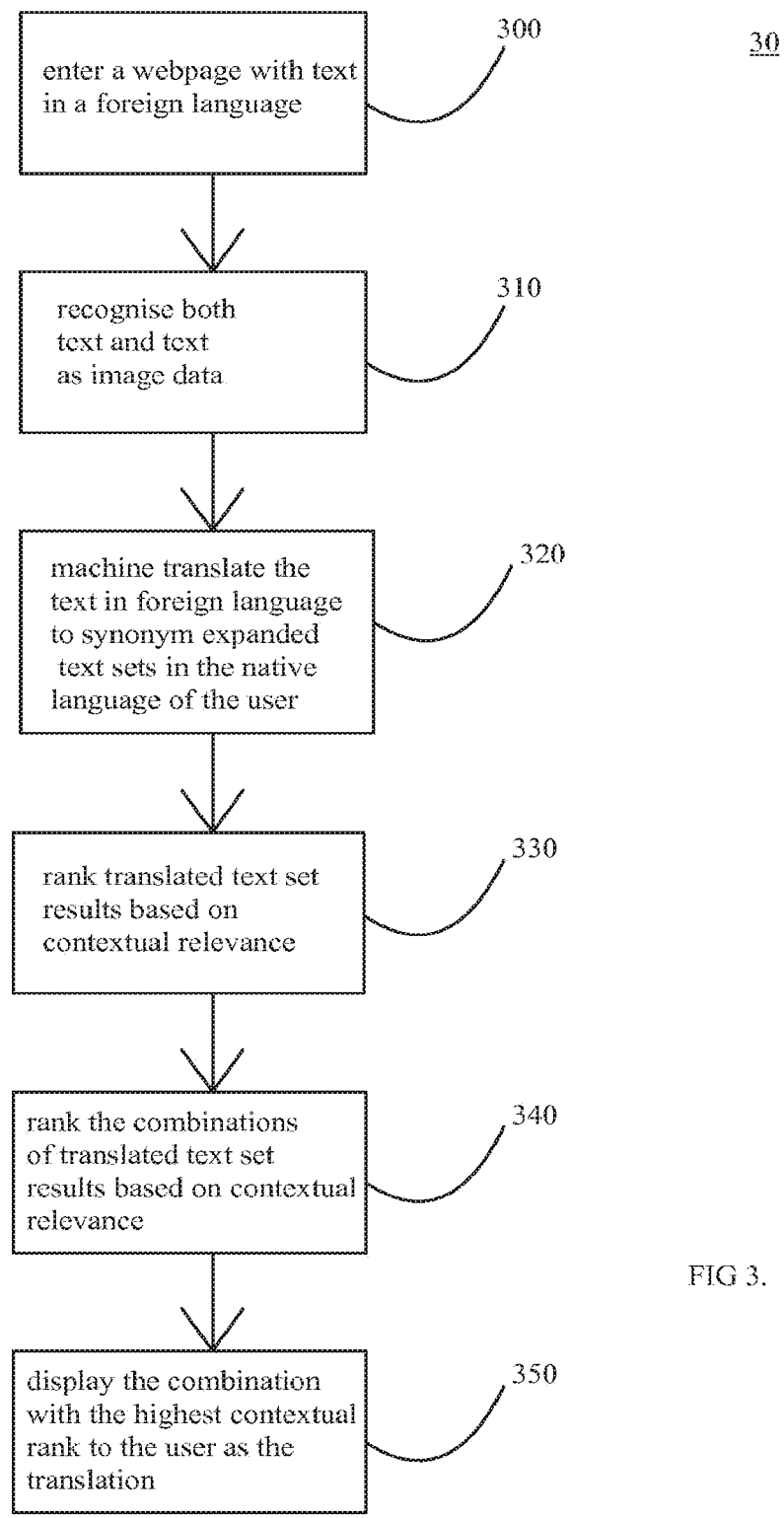
FIG. 3 demonstrates an embodiment 30 of the translation method in accordance with the invention.

FIG. 3 shows an embodiment of the inventive search method deployed to translation from one language to another language. Language translation is analogous to search in the sense that a corresponding word in another language is being searched when a translation is performed. Now, in phase 300 a user, software, Internet browser, or search engine software enters a webpage with text in a foreign language. The process of entering a webpage of a foreign language can be made invisible to the user in some embodiments, i.e. the webpage entered is not shown to the user requesting it in this embodiment.

In phase 310 text is recognised by the inventive computation system from the webpage that was entered in phase 300. Preferably text is recognised in phase 310 in any language, even if it has a different character set to European Alphabets used here, such as Chinese, Japanese, Korean, Thai, Cyrillic, Greek, Indonesian, any Indian alphabet such as Urdu or Hindi or the like. Also languages that are not used anymore, such as Latin or Egyptian hieroglyphs can be recognised in some embodiments in accordance with the invention.

On some web pages textual data is not stored in the form of text, but rather the text is in an image, which image is on the webpage. It is in accordance with the invention to recognise the text from the image data by character recognition, for example OCR (Object Character Recognition), or similar recognition algorithm.

In phase 320 the text in the foreign language is translated to synonym expanded text sets in the preferred language of the user. For example if the webpage would have contained a sentence "How to ship a box" and the user would use Finnish as his preferred language, be it native language or best language or any language of choice the translated synonym expanded sets could include for example:
"Kuinka randata laatikko laivalla",
"Kuinka lähettää laatikko",
"Millä keinoin lähettää paketti",
and so on.

Now, in some embodiments of the invention the inventive translation system defines a text set as the text between commas, a comma and a full stop, between stops, or a block of words of some length, e.g. 10 words.

In phase 330 the synonym expanded text set results are ranked based on contextual relevance. If there is only one text set on the webpage, the contextually most relevant text set is shown to the user as the translation in his preferred or native language. In some embodiments the translation is shown in a different application and/or Internet browser window on the computer of the user. In some embodiments the Internet browser shows the translated text in the same place on the webpage, i.e. thereby producing a 'virtual webpage' in a different language that otherwise looks the same as the original webpage, except that it is in a different language. The contextual data needed to perform the contextual ranking can be obtained similarly to other embodiments explained in this application.

If there is more than one text set on the webpage, in phase 340 the combinations of translated text set results are ranked based on their contextual relevance. The contextual relevance can be estimated for example based on how well the different translated text sets fit together, i.e. does the translation make sense in combination?

The contextual ranking of translations can be performed by any methods discussed in association with phase 130. For example a sentence is translated into several synonym expanded translation results. The synonym expanded translation results will then be compared in similarity to the other sentences in the text. Typically a paragraph of manmade text will feature antecedents and the like that cause the same or very similar terms to be carried out all through the text. The translation result that is contextually most similar to at least one surrounding sentence, or the words in a translation result that are most similar to surrounding words, will be chosen as the translation in preferred embodiments of the invention. In its simplest embodiment a translated word can be chosen based on its contextual similarity to only at least one other single word.

Quite clearly translation results can be contextually ranked by any of the methods explained in association with phase 130 in accordance with the invention. As the ranking has been achieved, typically the contextually highest ranking translation will be offered to the user as the final translation in accordance with the invention.

It should be understood that different search terms and/or context terms may have different weights, that may be assigned by the user, by the system, be updated from the network, or be pre-programmed into the computer in accordance with the invention.

It should also be understood that the context terms may be functional, rather than only plain words or numbers, for example context terms can be acquired in functional form such as the date, time, location, i.e. context terms can be functional or conditional beyond their plain meaning.

Similarly to as explained in phase 130 translated words can be compared against context words, context word ontologies and/or context ontologies in accordance with the invention. In some embodiments of the invention translated word ontologies may be compared against context words, context word ontologies, and/or context ontologies. Similarly to embodiments explained in phase 130 translated word groups and/or sentences can be compared against context words, context word ontologies, and/or context ontologies in accordance with the invention. Typically the translation result that has the greatest similarity with the context words, context word ontologies, and/or context ontologies will be ranked the highest in the contextual ranking and chosen as the translation in accordance with the invention.

It is also possible that semantic associations are used similarly as explained in phase 130. The translation result that has the highest semantic path weight to at least one context word and/or or context words is typically selected as the translation by the contextual ranking in some embodiments of the invention. For example, different grammar rules could be implemented by path weights: If the sentence has a subject followed by a verb which appears to be the predicate of the sentence, it is likely that at least one noun that follows will be the object of the verb. The nouns that are in the state of an object will thus carry higher path weights in that sentence. Quite clearly grammar rules can be deployed by the other contextual ranking techniques in accordance with the invention also. In one embodiment of the invention basic grammar rules are arranged to be programmed into the ontology of words.

Contextual relevance can also be based on data in the context folder. I.e. a Finnish user looking for fishing gear from typically Swedish shops that manufactures most of the desired fishing equipment can place for example Finnish Fishing Permit documentation into the context folder, as an image, text or document file, for example. The Internet Browser and/or the Search program will sense that the overall context now is fishing by analyzing the data in the context folder. As the Finnish user starts to browse the web pages in Swedish explaining product descriptions of lures, nets, rods etc. in Swedish the internet browser will translate the Swedish into Finnish and the Finnish customer can read the translated 'virtual' webpage from his browser.

The combination of text sets with the highest contextual rank is displayed to the user as the translation in phase 350 on the webpage, in a separate window, and/or on the webpage in the same place where the original text was, i.e. producing a virtual webpage in the translated language.

Therefore an Internet browser and/or search engine that translates web pages to a defined language, and shows the foreign web pages in the desired language is in accordance with the invention.

It is also in accordance with the invention that as the inventive translation software works on the web pages, the total body of web pages in any preferred language will increase. Some of these web pages may be indexed or even stored by search engines in accordance with the invention. These translated web pages can now of course be subjected to searches, normal searches or searches with the inventive search methods discussed earlier in accordance with the invention.

Quite clearly the invention can be used to translate any document from one language to the next; the use of the invention is not restricted to web browsing.

It should be noted that any features, phases or parts of the method 30 can be freely permuted and combined with embodiments 10, 20, 40 in accordance with the invention.

Figure 4:
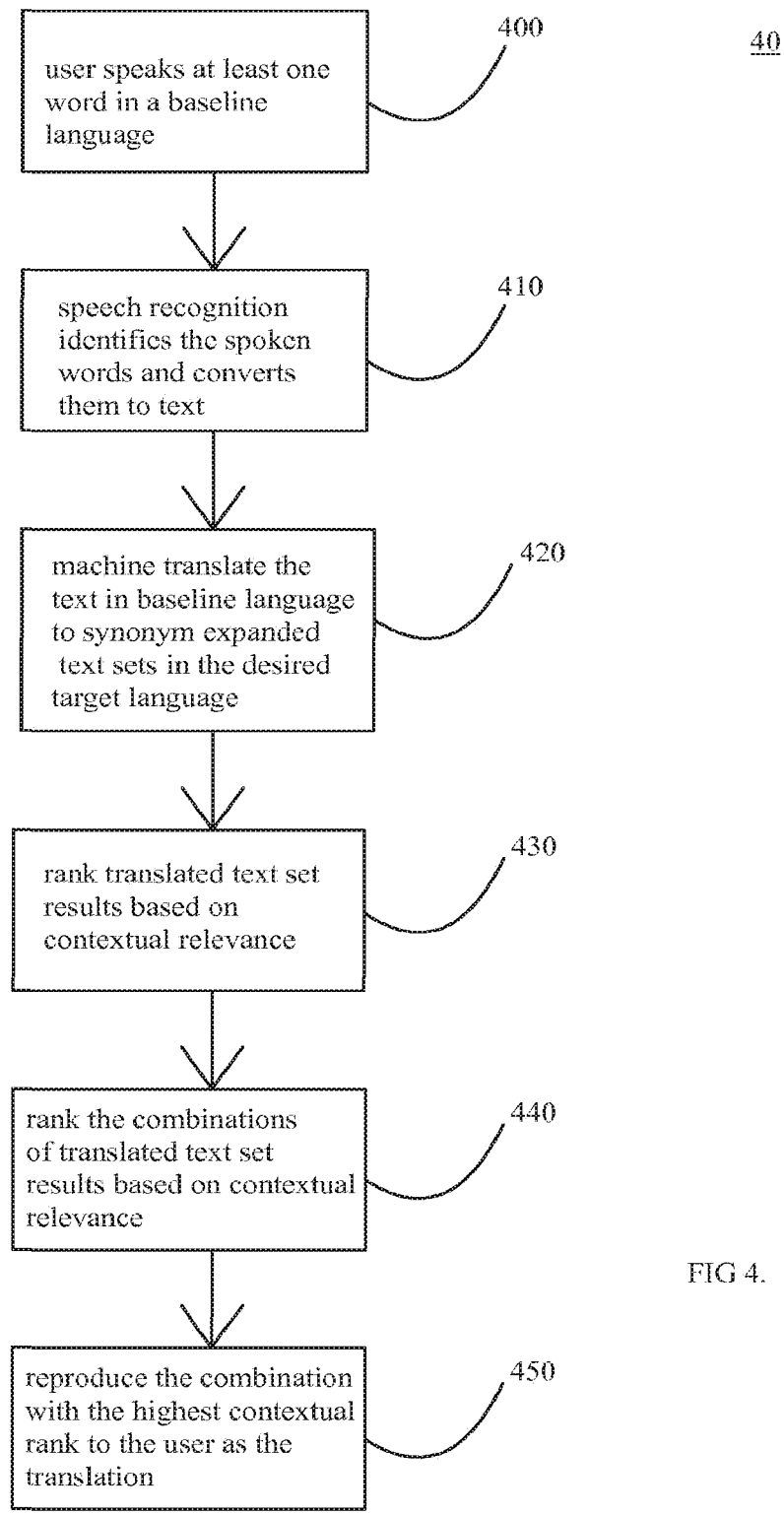
FIG. 4 demonstrates an embodiment 40 of the translation method using audiovisual input in accordance with the invention.

FIG. 4 displays the search-translation embodiment 40 in accordance with the invention, which is better suited to different categories of input. In phase 400 a user speaks at least one word in a baseline language, which typically is his preferred language, native language or the language he knows best. In fact, the baseline language can be any language in accordance with the invention. In phase 410 speech recognition identifies the spoken words and converts them to text. In some embodiments speech can be supplemented and/or replaced by image data, from which (image data text is extracted by pattern and/or character recognition. In some embodiments image and speech data can be also recognised in combination, for example a video camera will record both voice and images, and speech and/or sound recognition can be used to identify words from the audio and pattern recognition and/or character recognition can be used to recognise text in image format, words that have image equivalent, (image of a ball identified as="ball"). In the aforementioned ways, and other ways, audiovisual data can be distilled into text. This text can also be translated to another language in accordance with the invention. For example a distilled text in natural language English can be translated to French natural language in accordance with the invention.

In phase 420 the text extracted from audiovisual data is synonym expanded in the desired target language as explained elsewhere in this application. Different text sets are expanded with different synonym expansions. Now, as the input data arrives from a variety of sources, all the text can be synonym expanded as one text set in accordance with the invention, but sometimes it is more preferable to divide the input text into text sets. The text that is derived by speech recognition could be sorted separately, based on what voice speaks the words and other factors. In exemplary embodiments of the invention the computer system can identify who does the speaking. The speech recognised words with a certain voice can be recognised in blocks of 10 words or more or less, or for example the word groups in between pauses can be recognised as distinct text sets in accordance with the invention. Pattern recognised words from image data can be identified as individual words or word set that can be synonym expanded as a text set for example. It is also in accordance with the invention to combine words extracted from different types of audiovisual data.

In fact, the textual extraction of words from audiovisual data by pattern/character recognition is an inventive embodiment in its own right, without the synonym expansion or contextual ranking in accordance with the invention.

However, it is possible and in accordance with the invention that a recognised pattern/character will have synonyms in accordance with the invention, possibly many synonyms. For example a pattern shaped like a "C" could be the letter "C" in the European alphabet but it could also be a half part of a stadium or a velodrome in a picture. "half velodrome", "half stadium" and "C" would be synonyms in this case. This is the translation from character based language to a natural language in accordance with the invention. It is in accordance with the invention that the translation from audiovisual data may not use contextual ranking or synonym expansion in some embodiments as it is inventive in its own right. It is also possible in accordance with the invention that only synonym expansion or contextual ranking are used individually in accordance with the invention. However, in some embodiments it is preferable to use both synonym expansion and contextual ranking, and in some embodiments even more preferably so that the contextual ranking will only be conducted to the synonym expanded translation text set candidate.

In phase 430 the translated text sets, or those sets that were originally in the baseline language and did not need to be translated, are ranked based on contextual relevance.

The combinations of translated text sets are then ranked based on contextual relevance in phase 440.

The combination with the highest contextual rank is reproduced to the user as the translation and/or extraction of text. The reproduction can take place by reproducing the words as voice from a loudspeaker, or as images and/or footage on a screen and/or video that combines the two in the baseline language of the user in phase 450.

In some embodiments of the invention it is possible not to use the translation feature between natural languages e.g. (translating English traffic signs into English text then speech). Useful embodiment being for example a car camera and a computer that reads out traffic signs to the driver as they are videoed and/or photographed. It is possible and in accordance with the invention for the user to operate only the text extraction feature, i.e. translating patterns, characters, image, voice, into textual words. In some embodiments of the invention the extracted textual words that correspond to the data are searched by the synonym expansion—contextual ranking inventive technique.

The invention therefore makes it possible to extract a textual narrative from audiovisual data in the Internet or in the surrounding world around us that is video recorded, and provides for the textual translation of that data.

One simple embodiment of the invention could be realised for example into a portable device that translates English speech to a French loudspeaker broadcast using the synonym expand context rank technique.

However, the ability to extract data from different media types greatly enhances especially the context based ranking. Say for example the user is with a mobile phone in a Finnish harbour. He just took a picture from the harbour. The pattern recognition will recognise words "sea" and "ship" from the image, which was incidentally saved to the context folder (that acts as the source of context data) of the mobile device. "How to ship a box" will now be translated into Finnish "Kuinka randata laatikko laivalla", instead of the other alternatives, because the context is clear, we are trying to get a box onto an actual ship to some destination, rather than looking for the post office.

It is also in accordance with the invention to use a text document in the context folder of a language speech converter in accordance with the invention.

It should be noted that any features, phases or parts of the method 40 can be freely permuted and combined with embodiments 10, 20, 30 in accordance with the invention.

The invention has been explained above with reference to the aforementioned embodiments and several commercial and industrial advantages have been demonstrated. The methods and arrangements of the invention allow people to find relevant documents, based on the inventive synonym expansion-contextual ranking on that synonym expanded word set-technique. The same technique provides for more accurate translations from one natural language to another language from the Internet or documents, or from a combination of image language and speech to a natural language, either in textual or spoken form.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

WO 2009/002864 A2, Reizier, Stefan, Vasserman, Alexander, I. "Machine translation for query expansion".
"Desktop Search—How Contextual Information Influences Search Results and Rankings" Raluca Paiu and Wolfgang Nejdl.
"Context-Aware Semantic Association Ranking" Aleman-Meza Boanerges, Halaschek Chris, Arpinar I. Budak and Sheth Amit.
"Activity Based Metadata for Semantic Desktop Search"- Proceedings of the $2^{nd}$ European Semantic Web Conference, Heraklion, Greece, May 2005, P. Chirita, R. Gavriloaie, S. Ghita, W. Nejdl and R. Paiu.

The invention claimed is:

1. A Internet Search Engine stored in a memory medium of at least two server computers, wherein
a mixed search input query, comprising at least one text term and at least one image, is extracted from visual data provided by the camera of a mobile subscriber terminal, is received by said Internet search engine via a radio connection from the mobile subscriber terminal,
at least one document is searched from the Internet using said mixed search input query comprising the at least one image and the at least one text term with at least two server computers by said Internet search engine,
the mixed search input query is divided into different search queries, by the Internet search engine, that are executed by different computers within the same Internet search engine,
most relevant search results obtained using said mixed search input query are retrieved from the Internet to the mobile subscriber terminal via a radio connection by said Internet search engine using the different computers, and
most relevant search results are ranked based on one or more predefined contextual rules, wherein the one or more predefined contextual rules include data that is open in an application on the mobile subscriber terminal of the user, and wherein the one or more predefined contextual rules further include email context ontology, and wherein for the email context ontology, data appearing in sent emails of an email application open on the mobile subscriber terminal of the user are assigned a higher weight than data appearing in inbox of the email application.

2. The Internet Search Engine as claimed in claim 1, wherein, at least one search result is ranked based on location of the at least one mobile subscriber terminal and/or the nationality of the user of the mobile subscriber terminal.

3. The Internet Search Engine as claimed in claim 1, wherein, speech is used as input for search.

4. The Internet Search Engine as claimed in claim 1, wherein the one or more predefined contextual rules further include context ontologies selected from a group consisting of word ontologies, browser context ontology, context term ontology, and publication context ontology.

5. The Internet Search Engine as claimed in claim 4, wherein the user or the server computer assigns a weight to particular regions of the ontology, or to the entire ontology.

6. The Internet Search Engine as claimed in claim 5, wherein email context ontology is assigned a higher weight than browser context ontology.

7. The Internet Search Engine as claimed in claim 5, wherein for the context term ontology, weight of a term is assigned based on frequency of the term appearing in an application open on the mobile subscriber terminal of the user.

* * * * *